Sept. 12, 1972 M. KUISL 3,690,945

METHOD OF PRODUCING A TRANSISTOR WITH AN INSULATED CONTROL ELECTRODE

Filed April 27, 1970

Inventor:
Max Kuisl
BY Spencer & Kaye
ATTORNEYS.

United States Patent Office 3,690,945
Patented Sept. 12, 1972

3,690,945

METHOD OF PRODUCING A TRANSISTOR WITH AN INSULATED CONTROL ELECTRODE

Max Kuisl, Ay (Iller), Germany, assignor to Licentia, Patent-Verwaltungs-G.m.b.H., Frankfurt am Main, Germany Filed Apr. 27, 1970, Ser. No. 32,156
Claims priority, application Germany, May 7, 1969, P 19 23 265.6
Int. Cl. H01l 7/34
U.S. Cl. 117—215 4 Claims

ABSTRACT OF THE DISCLOSURE

A method of producing a transistor with an insulated control electrode comprises applying to a silicon semiconductor body an oxygen permeable insulating layer which does not consist of a silicon oxide for the control electrode, and thereafter tempering the semiconductor body in an atmosphere of oxygen to produce a silicon dioxide layer at the phase border between the insulating layer and the silicon body.

BACKGROUND OF THE INVENTION

The invention relates to a method of producing a transistor with an insulated control electrode, the semiconductor body of which consists of silicon.

SUMMARY OF THE INVENTION

According to the invention, there is provided a method of producing a transistor, having a semiconductor body of silicon, with an insulated control electrode, comprising the steps of applying an oxygen-permeable insulating layer different from a silicon oxide to said semiconductor body for said control electrode, and thereafter tempering said semiconductor body in an atmosphere of oxygen to produce a silicon dioxide layer at the phase border between the insulating layer and the silicon body.

BRIEF DESCRIPTION OF THE DRAWINGS

The invention will now be described in greater detail by way of example with reference to the accompanying drawings, in which.

DESCRIPTION OF THE PREFERRED EMBODIMENT

Figure 1:
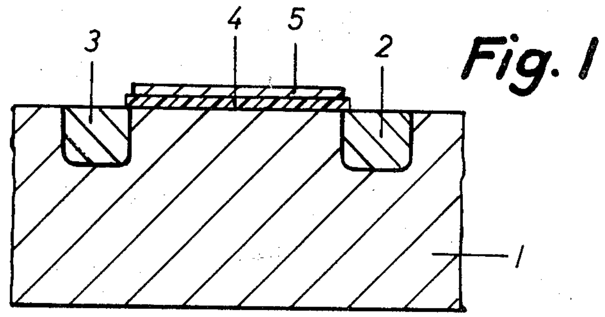
FIG. 1 is a sectional view of a field effect transistor prior to tempering in accordance with the method of the invention.

Basically the method of the invention consists in that an oxygen permeable insulating layer which does not consist of a silicon oxide is applied to the semiconductor body for the control electrode, and that after this insulating layer has been applied, the semiconductor body is tempered in an oxygen atmosphere. The insulating layer is selected so as to have as high a permittivity as possible. Examples of suitable materials for the insulating layer are titanium dioxide ($TiO_2$), niobium pentoxide ($Nb_2O_5$), tantalum pentoxide ($Ta_2O_5$) and zirconium dioxide ($ZrO_2$).

The invention has the advantage that during the tempering process in an oxygen atmosphere, oxygen passes through the insulating layer into the silicon body and produces, at the phase boundary between the insulating layer and the silicon, a layer of silicon dioxide which prevents unwanted surface states from being incorporated in an uncontrollable manner, in the insulator-semiconductor transition layer. The layer of $SiO_2$ developing under the insulating layer as a result of the tempering has the same advantageous properties as the $SiO_2$ boundary layer which develops in the event of direct oxidation of silicon. Furthermore, a reduction in the channel resistance of the transistor is obtained by using an insulating layer having as high a permittivity as possible.

The invention is explained in more detail below with reference to an example of an embodiment.

FG. 1 shows a field effect transistor which consists of a seimconductor body 1 of silicon with an insulated gate or control electrode, as well as the source electrode 2 and the drain electrode 3. In order to produce the insulated gate, an insulating layer 4, the material of which has as high a permittivity as possible in accordance with the invention, such as $TiO_2$, $Nb_2O_5$, $Ta_2O_5$, $ZrO_2$, is applied to the semiconductor body 1. The application of the insulating layer 4 may be effected, for example, by hydrolysis of the metal halides.

Finally, the gate or control electrode 5 is applied to the insulating layer 4, for example by vapour-deposition of Al, Au or Pt under vacuum.

Figure 2:
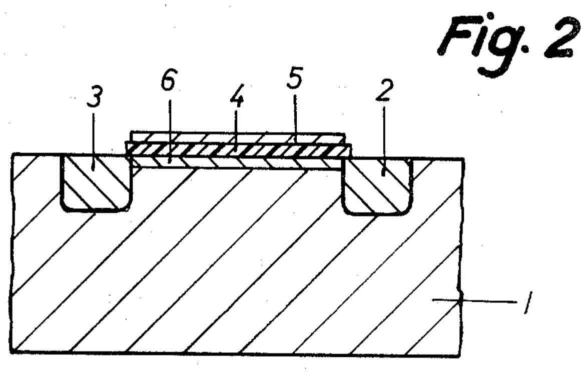
FIG. 2 is a view similar to FIG. 1 of a field effect transistor after tempering in accordance with the method of the invention.

In accordance with the invention, the semiconductor body is tempered in an atmosphere of oxygen after the application of the insulating layer 4, before or after the production of the gate electrode 5. The tempering may be effected, for example, at a temperature between 700 and 1000° C. As a result of the tempering process in an atmosphere of oxygen, disturbing surface states are prevented from being incorporated in the transition layer between the insulating layer 4 and the silicon body 1, as a result of the layer 6 of silicon dioxide resulting from the tempering process as shown in FIG. 2. Such a tempering process in an atmosphere of oxygen is important for all transistors with an insulated control electrode the insulating layer of which does not consists of a silicon dioxide.

It will be understood that the above description of the present invention is susceptible to various modifications, changes and adaptations.

What is claimed is:

1. In a method of producing a transistor having an insulated control electrode on a silicon semiconductor body, the improvement comprising the steps of: applying an oxygen-permeable insulating layer consisting of a material selected from the group consisting of titanium oxide ($TiO_2$), niobium oxide ($Nb_2O_5$), tatalum pentoxide ($Ta_2O_5$), and zirconium dioxide ($ZrO_2$) to said semiconductor body for said control electrode, and thereafter heating said semiconductor body in an atmosphere of oxygen for producing a silicon dioxide layer at the phase border between said insulating layer and said silicon body.

2. A method as defined in claim 1, wherein said semiconductor body is heated at a temperature between 700 and 1000° C.

3. A method as defined in claim 1, further comprising selecting said material of said insulating layer to have a high permittivity.

4. A method as defined in claim 3, wherein said semiconductor body is heated at a temperature between 700 and 1000° C.

References Cited

UNITED STATES PATENTS 3,201,667 8/1965 Varga ............ 117—221 X
3,502,950 3/1970 Nigh et al. ........ 117—200 X RALPH S. KENDALL, Primary Examiner U.S. Cl. X.R.

117—221